Figure 1:
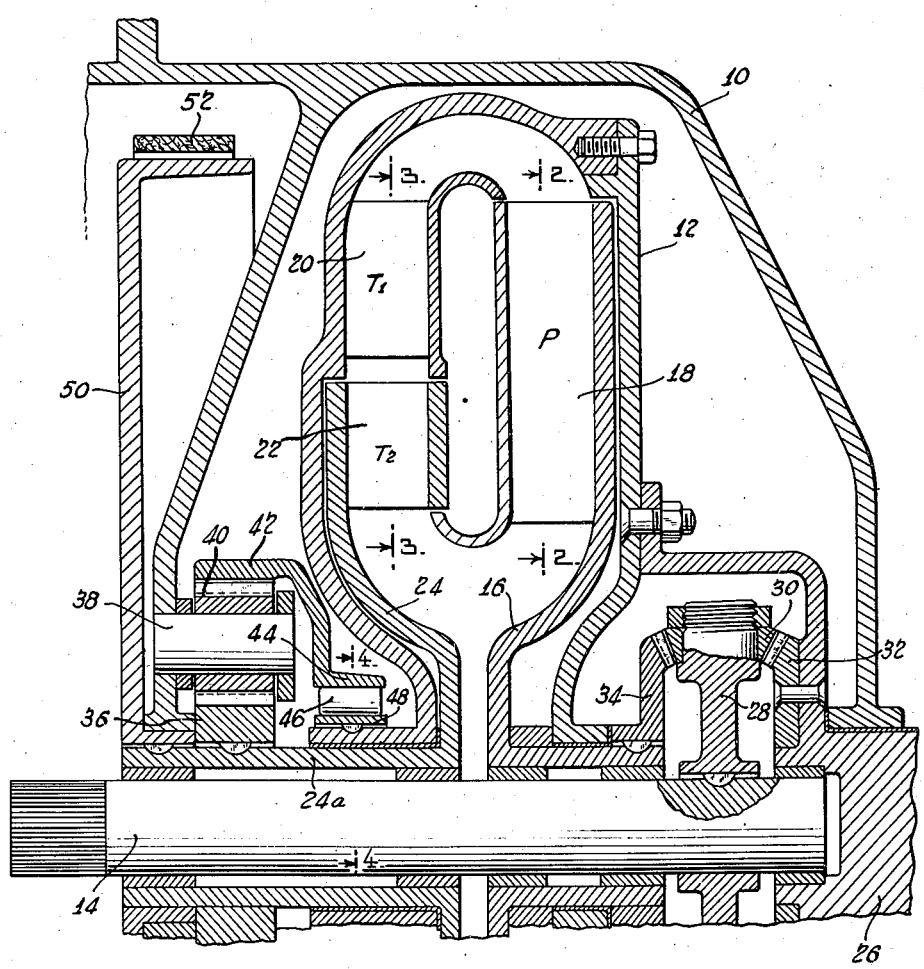

Sept. 4, 1945. A. LYSHOLM 2,383,981
HYDRAULIC VARIABLE SPEED POWER TRANSMISSION
Filed Aug. 25, 1943 3 Sheets-Sheet 1

Sept. 4, 1945.  A. LYSHOLM  2,383,981
HYDRAULIC VARIABLE SPEED POWER TRANSMISSION
Filed Aug. 25, 1943   3 Sheets-Sheet 2

INVENTOR.

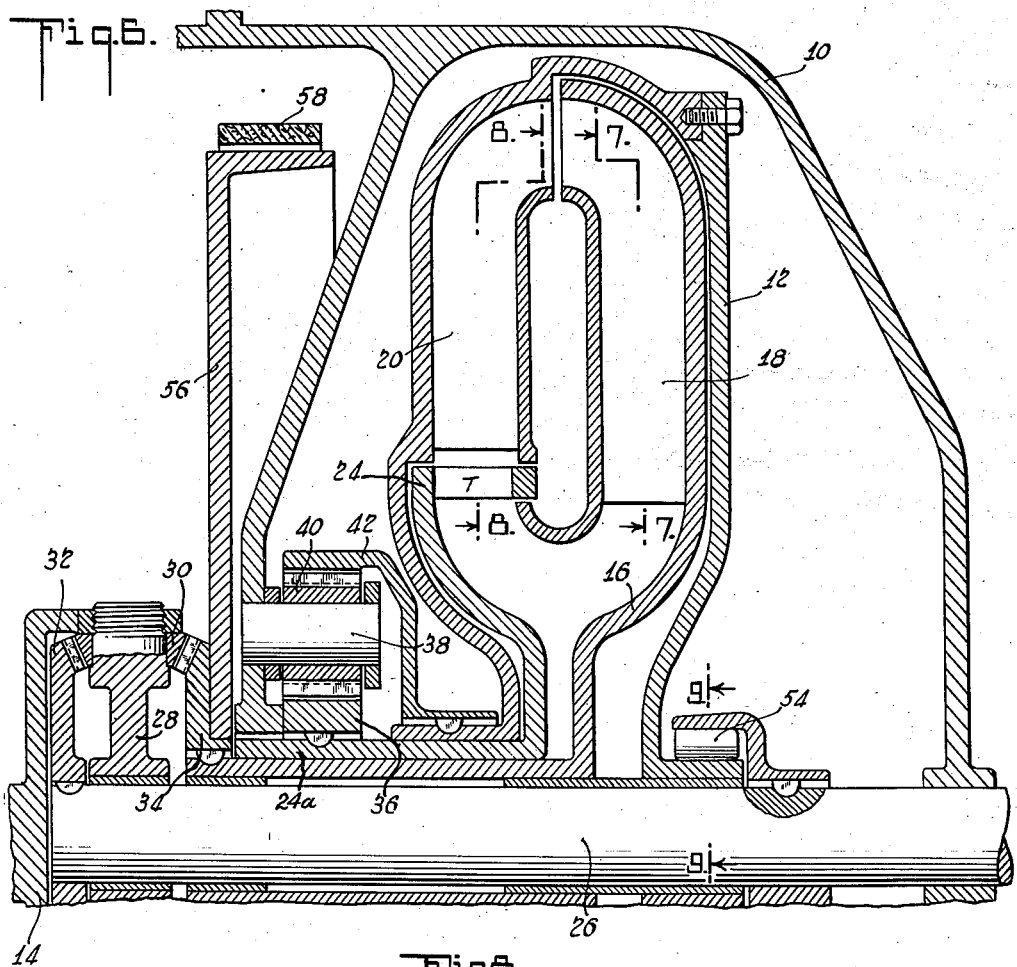
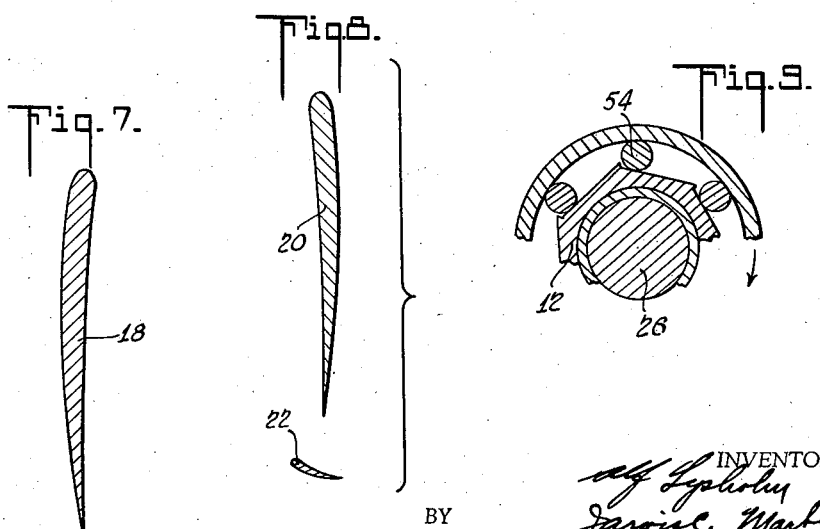

Patented Sept. 4, 1945

2,383,981

UNITED STATES PATENT OFFICE 2,383,981

HYDRAULIC VARIABLE SPEED POWER TRANSMISSION

Alf Lysholm, Stockholm, Sweden, assignor, by mesne assignments, to Jarvis C. Marble, New York, N. Y., Leslie M. Merrill, Westfield, N. J., and Percy H. Batten, Racine, Wis., as trustees Application August 25, 1943, Serial No. 500,009

6 Claims. (Cl. 74—189.5)

The present invention relates to hydraulic variable speed power transmissions and more particularly to such transmissions embodying a torque multiplying hydraulic converter.

It is the general object of the invention to provide a new form of transmission of the kind under consideration embodying a novel arrangement of mechanical and hydraulic parts cooperating to provide highly efficient operation over a wide range of secondary or driven shaft speed and desirable characteristics of both output torque and input torque absorbing capacity, while at the same time having relatively few and simple parts enabling the mechanism to be produced relatively cheaply. In order to achieve the foregoing general object and other and more detailed objects which will hereinafter appear, the invention contemplates the employment of a hydraulic mechanism of the so-called double rotation type, that is, one in which two turbine or driven wheels are bladed and incorporated into the mechanism so as to turn in opposed directions, and further contemplates the simultaneous application of the input torque to the pump or driving member of the torque converter and also directly to the secondary or driven member of the transmission, the two paths of power transmission from the input to the output members being differentially connected and operating in parallel so that the input torque is in effect split, part being transmitted hydraulically and part mechanically.

For a better understanding of the more detailed nature of the invention, its more detailed objects and the advantages to be derived from its use, reference may best be had to the ensuing portion of this specification, taken in conjunction with the accompanying drawings, which describe and illustrate by way of example, but without limitation, suitable structures for carrying the invention into effect.

Figure 2:
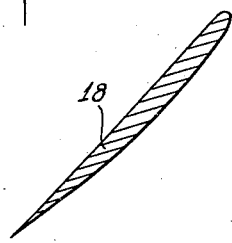
Figure 3:
Figure 4:
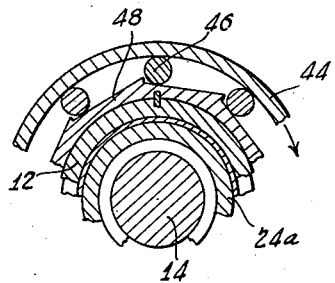
Figure 5:
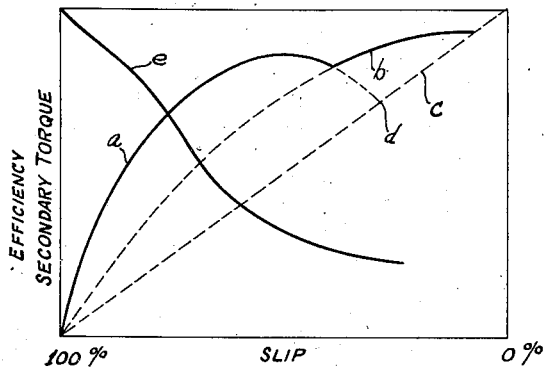

In the drawings:

Fig. 1 is a more or less diagrammatic longitudinal half section of a transmission embodying the invention;

Figs. 2, 3 and 4 are fragmentary sections taken along lines 2—2, 3—3 and 4—4, respectively, of Fig. 1;

Fig. 5 is a diagram illustrative of performance characteristics of the device shown in Fig. 1;

Fig. 6 is a view similar to Fig. 1 showing another device embodying the invention, and Figs. 7, 8 and 9 are fragmentary sections taken on lines 7—7, 8—8, and 9—9, respectively, of Fig. 6.

Referring now more particularly to Fig. 1, the transmission shown comprises a rotationally stationary housing 10 within which is located the rotatably mounted converter casing 12. A centrally located drive or power input shaft 14 has journalled thereon a pump wheel 16 carrying a ring of pump blades 18. The casing 12 carries a ring of turbine blades 20, these blades being shaped and arranged to cause the casing to rotate in the same direction as the pump wheel (which will be considered as forward rotation) when the working liquid is circulated in the hydraulic circuit by the action of the pump. A second ring of turbine blades 22 is carried by a turbine wheel 24 the shaft portion 24a of which is in the form of a sleeve journalled on the input shaft 14. The blades 22 are arranged to receive the discharge from blades 20 and are shaped and arranged to cause the wheel 24 to rotate in the opposite or reverse direction with respect to the pump wheel when the working fluid is circulated and whenever conditions are such that the wheel 24 acts as a power transmitting member.

The output or tail shaft member 26 of the transmission is fixed to the rotating casing 12 carrying the turbine blades 20, and torque from the input shaft 14 is transmitted to this member and to the pump wheel 16 through differential gear mechanism. In the example shown, this mechanism comprises a pinion carrier 28 fixed to shaft 14 and carrying a plurality of bevel pinions one of which is shown at 30. The pinions 30 mesh with a bevel ring gear 32 fixed to the tail shaft member 26 and also mesh with a second bevel ring gear 34 fixed to the shaft part of pump wheel 16.

The shaft part 24a of the turbine wheel 24 carries the central gear 36 of a gearing having a rotationally stationary pinion carrier 38 fixed to the housing 10 and carrying pinions 40 meshing with gear 36 and also with an internal gear member 42. One portion of member 42 provides the outer race 44 of a freewheel clutch having rollers 46 engaging an inner clutch race 48 fixed to the rotating casing 12. Shaft part 24a also has fixed to its outer end a brake drum 50 adapted to be selectively engaged by a brake band 52 to hold the turbine wheel 24 against rotation.

The mechanical functioning of the device just described will be largely evident from the drawings. Part of the input torque operates the pump to circulate the hydraulic fluid and impose a forward torque on the blades 20 and the casing 12. Torque in reverse direction is imposed on blades 22, but the direction of this torque is reversed by the gearing 36, 40, 42 and transmitted to the casing 12 through the freewheel clutch, so that the torques from the two turbine wheels are added and applied to the casing and the tail shaft in forward direction.

There are, however, several very important factors involved in the operation of the above described organization. Certain of these are inherent in the type of apparatus employed, particularly the double rotation converter. The double rotation converter has certain very definite advantages, such for example as the very rapid rise in efficiency from zero value at stall of the driven member as the latter speeds up and the relatively few rows of blading required to secure given maximum efficiency and torque multiplication characteristics. On the other hand, the three element double rotation converter, that is, one having only a pump element and two turbine elements so that the reversely rotating turbine blades discharge to the pump inlet, has an inherently unsatisfactory torque absorbing or input torque characteristic when used alone as a power transmitter. The reason for this is that the change in the relative inlet angle of entrance of the working liquid to the pump from the reversely rotating turbine blades, tends to "unload" the pump as the turbine blades speed decreases. Thus, as the secondary speed decreases, the amount of power that can be absorbed by the pump progressively decreases. In order to overcome this defect and provide a suitable input torque characteristic, expedients such as the introduction of additional guide blade elements at the entrance to the pump have been proposed, but by the arrangement characteristic of this invention, the torque input characteristic, heretofore considered as a defect, is turned to advantageous account. By splitting the input torque through differential gearing it will be evident that with a constant input shaft speed, the speed of rotation of the pump will be greatest when the tail shaft is stalled and will progressively decrease as the tail shaft speeds up from stall. Thus in the example herein disclosed, wherein the input torque is split evenly by use of driven gears 32 and 34 of equal diameter, the speed of the pump will be twice that of the power input shaft when the tail shaft is stalled, and will be the same as that of the power input shaft when the tailshaft speed equals that of the power input shaft. With this character of variable pump speed, which requires that in normal operation the pump speed must increase relative to input shaft speed as the tail shaft speed decreases, the tendency of the relative inlet angle of flow to the pump to unload it as the reversely rotating blades slow down, is countered by the fact that the pump must be driven faster and can therefore absorb more power. The rate of circulation of the working fluid in the hydraulic circuit is directly proportional to pump speed, the torque absorption varies as the square of the pump speed and the power absorption varies as the cube of the pump speed. From these relationships it will be evident that if the inlet conditions to the pump were constant, the split torque arrangement could not be used practically, since the torque absorption by the pump when speeded up due to decrease in tail shaft speed would place too great a torque load on the input shaft to enable it to be kept up to speed. However, when the split torque arrangement is combined with the double rotation converter, the characteristic tendency of that type of converter to unload the pump as the turbine blade speed decreases (which it does as the pump speed increases) modifies the relationship between pump speed and torque input requirements so that the input torque to the pump may be kept relatively constant regardless of pump speed, if that is desired.

Since the factors determining the input torque characteristic of the pump are the pump speed and the velocity diagram of the liquid flowing to the pump, this characteristic may be modified to suit any particular need by suitably selecting the gear ratio embodied in the differential drive from the input shaft to the pump and to the tail shaft and by suitable selection of the outlet angle of the reversely rotating turbine blades and the ratio of the gears in the reversing gear train, which two latter factors are determinative of the nature and ratio of variation of the velocity diagram of the liquid discharged to the pump.

Thus by combining, in accordance with the present invention, a split torque drive to a torque converter, which generally provides an impractical form of drive, with a three element double rotation converter which also by itself provides an impractical form of drive, the impractical features of each are eliminated and a form of drive having highly satisfactory characteristics is obtained, which insofar as input torque characteristics is concerned can be designed to provide for substantially constant input torque over the working speed range or slightly rising or falling input torque characteristics with increase in secondary speed, depending on the ratios of the gearing employed for the differential gear drive and for the gearing which interconnects the forwardly and reversely rotating turbine wheels.

In addition to providing the possibility of obtaining desired input torque characteristics, transmissions embodying the present invention are capable of providing highly efficient transmission of power over a wide secondary speed range, particularly when features are incorporated which permit of change of operation of the converter from double rotation operation to single rotation operation.

In the structure shown in Fig. 1, means for effecting changeover from double rotation to single rotation operation of the converter is shown, this means comprising the brake drum 50 and brake band 52, by means of which the reversely rotating turbine wheel can be locked against rotation so as to provide a stationary reaction member.

By reference to the diagram of Fig. 5, the nature of the efficiency curve obtained by such a transmission is indicated. If it is assumed that the brake for the reversely rotating turbine wheel is released and operation is started from stall, the efficiency curve $a$ will rise rapidly as the secondary shaft increases in speed from stall. This is due to the fact that because of the reversely rotating turbine wheels the relative speed between the turbine blades rises very much more rapidly than would be the case if the converter were operating as a single rotation converter with one of the sets of blades stationary. In the specific example illustrated the ratio of the gearing connecting the forwardly and reversely rotating turbine wheels is such that the reversely rotating wheel has an absolute speed nearly twice that of the forwardly rotating wheel. Consequently, the relative speed between the two wheels is substantially three times as great as would be the case between a forwardly rotating turbine wheel and a stationary reaction member in a single rotation turbine.

Also, due to the fact that in the present example the differential input gearing provides a 1-1 ratio between the tail shaft and the converter pump, the input torque is evenly split between these two elements. A double rotation torque converter of medium size and known design can be expected to produce a peak efficiency of around 85%, but in the present instance, due to the fact that only half of the torque is transmitted through the converter while the remaining half is transmitted through gearing in which there is only negligible loss, the overall peak efficiency obtainable in double rotation converter drive may be well over 90%.

Due to the fact that relative blade speed between the forwardly and reversely rotating turbine blades in a double rotation converter increases very rapidly with increase in tail shaft speed, the efficiency curve reaches its peak at a lower relative speed than in the case of a single rotation converter and thereafter begins to fall off. If a transmission is desired which will carry a secondary shaft speed up to one closely approaching primary shaft speed, then it is desirable to provide the means whereby single rotation converter operation can be employed. In the diagram of Fig. 5, the curve b indicates the efficiency obtained by single rotation operation and as will be evident from a consideration of the solid line portions of curves a and b, highly efficient operation in the range above 90% is obtainable over a wide range of secondary speeds.

The general organization illustrated also provides means whereby, if desired, and through very simple means, the drive can be shifted at very high relative secondary speed (low slip) to coupling drive. This is accomplished by providing the free wheel connection in the gearing connecting the forwardly and reversely rotating turbine wheels. Thus, if coupling drive is desired when the secondary speed is high, all that is necessary is to release the brake holding the turbine wheel which acts as the stationary reaction member in single rotation drive. If this is done under the assumed conditions the wheel 24 will float, rotating forwardly in the same direction as the turbine wheel 20. This is due to the fact that with high tail shaft speed the relative inlet angle of the liquid from the first to the second turbine wheel will be such that the liquid will strike the back faces of the blades in the second turbine wheel tending to impose a forwardly rotating torque on that wheel. If, for example, the tail shaft speed decreased under such conditions due to an increase in the load imposed on the transmission, coupling operation would continue until a relative speed or slip between input and tail shafts was reached at which the relative inlet angle of entrance to the second turbine wheel would again strike the forward faces of the blades of that wheel and tend to rotate it in the first direction. As soon as such condition obtained, the free wheel clutch would engage and the transmission would automatically go over to double rotation converter drive. The efficiency during such transition would drop along the line c of the diagram until that line intersected curve a, and from an inspection of the figure it will be observed that one point, d, would be reached where the efficiency would be relatively low. Such being the case, better operation would dictate the locking of the second turbine wheel to provide single rotation operation in the range of transition from efficient coupling operation to the place where efficient operation dictates the employment of double rotation drive.

With an arrangement such as the one disclosed, other advantageous operation may be utilized, depending upon the load and speed conditions. By employing suitably geared reversely rotating turbine wheels a relatively high stall torque ratio of 5-1 or better is readily obtained, the nature of the secondary torque curve when in double rotation drive being indicated by curve e. The maximum torque obtainable in single rotation drive is, of course, materially less in an arrangement of the kind shown, since the single rotation converter is only a single stage device. However, under certain conditions where high stalling torque is not required and a vehicle or the like may go through the range of low relative speeds quickly so that acceptable efficiency with single rotation operation can be quickly obtained, the transmission may be started from stall as a single rotation transmission by immediately locking the brake drum 50.

It is to be noted also that when a shift is made from double rotation to single rotation drive, if that is done, this shift tends to unload the pump somewhat which would permit an engine driving through such a transmission to speed up at the changeover point. Thus the transmission may advantageously be employed to make use of the flexibility of operation of a high speed flexible engine.

From the foregoing discussion it will clearly be evident that in so far as the present invention is concerned the transmission may be constructed to operate at all times in double rotation operation in which case the brake drum and free wheel clutch will be omitted, or it may be constructed for double and single rotation converter operation without coupling operation in which case the brake drum will be retained and only the free wheel clutch omitted.

By combining the double rotation converter with the split torque input it is also readily possible to obtain a type of drive including a mechanical direct drive which will provide overdrive to the tail shaft, without increasing the number or complication of the parts as previously described in connection with Fig. 1. Such an arrangement is illustrated in Fig. 6, in which the input shaft 14 drives through pinion carrier 28 and pinions 30 to a tail shaft gear 32 on the tail shaft 26 and to the pump gear 34 connected to the pump wheel 16, as in the previously described embodiment. Also, as in the previously described embodiment, the turbine wheels 12 and 24 are interconnected by the central gear 36 fixed to part 24a of wheel 24, stationary pinion carrier 38 fixed to the stationary housing 10, pinions 40 and internal gear 42 fixed to the rotating casing 12. The present arrangement differs from the previously described embodiment in that the free wheel clutch between the internal gear 42 and the rotating casing is omitted. Instead, the casing 12 transmits power to the tail shaft 26 through the freewheel clutch having rollers 54. Also, in the present embodiment, the pump wheel member 16 is provided with a brake drum 56 arranged to be held against rotation by a brake band 58, this pump brake being provided instead of the brake for the reversely rotating turbine wheel provided in the arrangement shown in Fig. 1. Thus it will be seen that the two forms of transmission contain the same major elements, the difference being that in the present embodiment the free wheel is shifted from the gearing between the turbine wheels to a position between the rotating casing and the tail shaft and the brake is shifted from the reversely rotating turbine member to the pump member.

With the present form of transmission, single rotation operation is dispensed with and double rotation converter drive is employed in the lower portion of the speed range of the secondary shaft speeds. By suitably designing and gearing the pump and turbine wheels the efficiency curve in converter operation can be shifted so that the peak efficiency is reached at a higher secondary shaft speed than is attained for example in the form shown in the diagram of Fig. 5. With a design giving such a characteristic the stalling torque ratio will not be so high and will fall off from the value at stall as the tail shaft speed increases in the well known manner characteristic of this type of converter. In the present arrangement, when the tail shaft speed has reached a suitably high value, usually somewhat past the value at which peak efficiency in converter drive occurs, the torque multiplication in the converter drive will have fallen to a value sufficiently low so that a shift to direct drive can be made. At this point, if higher tail shaft speed is desired, the brake is applied to the pump wheel. This is possible because of the differential gear drive from the input shaft to the pump and tail shaft members, and with the pump member stopped the drive is then entirely mechanical through the differential input gearing. Obviously, due to this gearing the tail shaft speed is greater than the input shaft speed, the difference in speeds being determined by the ratio selected for the input differential gearing. When the direct drive is employed by stopping the pump, the freewheel rollers 54 disengage and permit the rotating casing 12 and the turbine blading of the converter to come to rest so that the whole hydraulic mechanism is out of action when mechanical drive is employed.

The above described form of transmission is particualrly suited for certain kinds of automotive drives where high stalling torque and a very wide range of tail shaft speeds is desired.

The specific form and arrangement of the blading employed is advantageously made differently for converters from which different operating characteristics are desired. Thus for a transmission having a high stall torque and with maximum efficiency in double rotation operation, reached at a comparatively low secondary speed, the blading is advantageously of the nature shown in Figs. 1 to 3, characterized by relatively large outlet angles. For transmissions of the kind shown in Fig. 6, in which double rotation operation is intended for the major portion or all of the secondary speed range, the blading is preferably as shown in Figs. 7 and 8, characterized by substantially radially arranged pump and forwardly rotating turbine blading and with the reversely rotating blading having a relatively very small outlet angle.

Within the scope of the invention many different arrangnements of hydraulic blading and of arrangement and gearing of the parts may be resorted to and it is, therefore, to be understood that the invention embraces all forms of apparatus falling within the scope of the appended claims.

What is claimed is:

1. A power transmission including a double rotation converted having a rotatably mounted casing, a single pump wheel mounted to rotate within said casing, a forwardly rotating turbine wheel constituting a part of said rotating casing and to which said pump wheel discharges and a reversely rotating turbine wheel mounted to rotate within said casing to which said forwardly rotating turbine wheel discharges and which discharges to the inlet of said pump wheel, a driven member, means for transmitting torque generated by said turbine wheels to said driven member, a driving member and differential gearing for transmitting power from said driving member to said pump wheel and to said driven member.

2. A power transmission including a double rotation converter having a sigle pump wheel, a forwardly rotating turbine wheel to which said pump wheel discharges and a reversely rotating turbine wheel to which said forwardly rotating turbine wheel discharges and which discharges to the inlet of said pump wheel, a driven member, means including a one-way clutch between said reversely rotating turbine wheel and said driven member for transmitting torque generated by said turbine wheels to said driven member, a driving member, differential gearing for transmitting power from said driving member to said pump wheel and to said driven member and means for selectively holding said reversely rotating turbine wheel stationary to change the operation of said converter to single rotation operation.

3. A power transmission comprising a rotationally stationary structure, a rotating housing, a driving member, a driven member, a pump wheel mounted to rotate within said casing, a differential gear connecting said driving member with said pump member on the one hand and said driven member on the other hand, a first turbine wheel forming an integral part of said casing arranged to receive the discharge from said pump wheel, a second turbine wheel mounted to rotate in said casing to receive the discharge from said first turbine wheel and to discharge to the inlet of said pump wheel, said second turbine wheel having blading arranged to cause the same to rotate in a direction opposite that of said first turbine wheel, force transmitting mechanism including motion reversing gearing and a one-way clutch for transmitting torque from said second turbine wheel to said casing and means for selectively holding said reversely rotating turbine wheel stationary, said casing being fixed to said driven member to transmit thereto torque developed by said turbine members.

4. A power transmission including a double rotation converter having a single pump wheel, a forwardly rotating turbine wheel to which said pump wheel discharges, a reversely rotating turbine wheel to which said forwardly rotating turbine wheel discharges and which discharges to the inlet of said pump wheel, a rotating casing integral with said forwardly rotating turbine wheel, a driven member, gearing inter-connecting said reversely rotating turbine wheel for transmitting torque generated thereby to said casing, a one-way clutch for transmitting torque from said casing to said driven member, a driving member, differential gearing for transmitting power from said driving member to said pump wheel and to said driven member and means for selectively holding said pump wheel stationary to provide a mechanical overdrive from said driving member to said driven member due to said differential gearing.

5. A device as set forth in claim 2 in which said forwardly and reversely rotating turbine wheels are provided with blades having relatively large outlet angles.

6. A device as set forth in claim 4 in which said pump wheel and said forwardly rotating turbine wheel are provided with substantially radially extending blades and said reversely rotating turbine wheel is provided with blades having a relatively very small outlet angle.

ALF LYSHOLM.